(12) United States Patent
Hamada et al.

(10) Patent No.: US 11,906,735 B2
(45) Date of Patent: Feb. 20, 2024

(54) HEAD-UP DISPLAY DEVICE

(71) Applicant: KOITO MANUFACTURING CO., LTD., Tokyo (JP)

(72) Inventors: Yuri Hamada, Shizuoka (JP); Kazuomi Murakami, Shizuoka (JP); Takanobu Toyoshima, Shizuoka (JP); Hideaki Yamamoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/302,372

(22) Filed: Apr. 18, 2023

(65) Prior Publication Data

US 2023/0258933 A1 Aug. 17, 2023

Related U.S. Application Data

(63) Continuation of application No. PCT/JP2021/038405, filed on Oct. 18, 2021.

(30) Foreign Application Priority Data

Oct. 22, 2020 (JP) .................. 2020-177483
Mar. 30, 2021 (JP) .................. 2021-057226

(51) Int. Cl.
*G02B 27/01* (2006.01)
*G02B 27/09* (2006.01)
*G02B 27/10* (2006.01)

(52) U.S. Cl.
CPC ..... *G02B 27/0101* (2013.01); *G02B 27/0983* (2013.01); *G02B 27/106* (2013.01)

(58) Field of Classification Search
None
See application file for complete search history.

(56) References Cited

U.S. PATENT DOCUMENTS

2016/0178902 A1 6/2016 Ando et al.
2016/0202479 A1* 7/2016 Okayama .............. B60R 1/00
359/633

(Continued)

FOREIGN PATENT DOCUMENTS

JP 2010-134287 A 6/2010
JP 2015-34919 A 2/2015

(Continued)

OTHER PUBLICATIONS

International Search Report for PCT/JP2021/038405 filed Dec. 14, 2021.

*Primary Examiner* — Stephen T. Reed
(74) *Attorney, Agent, or Firm* — Sughrue Mion, PLLC

(57) ABSTRACT

A head-up display device (10) includes one picture generation unit (20) that emits both first light (L1) and second light (L2) and includes an optical path adjuster (40) disposed in an optical path of at least one of the first light (L1) and the second light (L2) and having light transmission properties and substantially zero optical power. The optical path adjuster (40) gradually separates the first light (L1) and the second light (L2) as compared with a state before at least one of the first light (L1) and the second light (L2) enters the optical path adjuster (40) in such a manner that the first light (L1) creates a first virtual image (V1) in a position closer to an operator and the second light (L2) creates a second virtual image (V2) in a position farther from the operator than the first virtual image (V1).

9 Claims, 2 Drawing Sheets

(56) References Cited

U.S. PATENT DOCUMENTS

2017/0285338 A1* 10/2017 Narushima ............ B60K 35/00
2020/0026075 A1   1/2020 Kim et al.
2020/0353817 A1* 11/2020 Nakada .................. B60Q 1/02
2022/0365345 A1* 11/2022 Hamada .................. H04N 5/64

FOREIGN PATENT DOCUMENTS

| JP | 2017-27632 A | 2/2017 |
| JP | 2017-181644 A | 10/2017 |
| WO | 2015/159521 A1 | 10/2015 |

* cited by examiner

HEAD-UP DISPLAY DEVICE

TECHNICAL FIELD

The present invention relates to a head-up display device, more specifically, a head-up display device capable of displaying virtual images in front of an operator at a relatively short distance and at a relatively long distance.

BACKGROUND ART

In recent years, as disclosed in the following Patent Literature 1, for example, there is known a head-up display device capable of displaying a virtual image in a position relatively close to the windshield and another virtual image in a position farther than this image. The head-up display device disclosed in Patent Literature 1 includes two picture generation units (PGUs). One picture generation unit emits light to create a virtual image in a closer position and the other picture generation unit emits light to create a virtual image in a farther position.

[Patent Literature 1] WO 2015/159521 A1

SUMMARY OF INVENTION

However, the head-up display device disclosed in Patent Literature 1 requires two picture generation units to display a long-distance virtual image and a short-distance virtual image, which increases the size of the device.

The invention has been made in light of the problem and an object of the invention is to provide a head-up display device capable of displaying both a short-distance virtual image and a long-distance virtual image without increasing the size of the device.

To achieve the object, the head-up display device according to the invention includes one picture generation unit configured to emit both first light and second light and includes an optical path adjuster disposed on an optical path of at least one of the first light and the second light and having light transmission properties and substantially zero optical power. The optical path adjuster is configured to gradually separate the first light and the second light as compared with a state before at least one of the first light and the second light enters the optical path adjuster in such a manner that the first light creates a first virtual image in a position closer to an operator and the second light creates a second virtual image in a position farther from the operator than the first virtual image.

In order to allow sufficient space between two virtual images to offer a sense of perspective to an operator, light for creating a long-distance virtual image and light for creating a short-distance virtual image are typically required to be emitted from a picture generation unit while not being close to each other. However, a plurality of light rays emitted from one picture generation unit typically tends to be emitted in almost parallel to each other, and it is difficult to generate virtual images at long and short distances distinguishable for an operator by one picture generation unit. In this head-up display device, contrarily, the first light and the second light gradually separate from each other through the optical path adjuster as compared with a state before at least one of the first light and the second light enters the optical path adjuster in such a manner that the first light creates the first virtual image and the second light creates the second virtual image. Therefore, it is possible to generate two virtual images that offer a sense of perspective to an operator by one picture generation unit. An example of the optical path adjuster having substantially zero optical power includes a prism.

Unlike the head-up display device disclosed in Patent Literature 1 which generates a long-distance virtual image and a short-distance virtual image using two picture generation units, this head-up display device generates a long-distance virtual image and a short-distance virtual image by one picture generation unit. Accordingly, the number of picture generation units is reduced and the device is prevented from increasing in size.

Furthermore, the head-up display device preferably includes a reflector configured to reflect both the first light and the second light and allow each light to reach a point of view of the operator.

In this case, optical paths of the first light and the second light are changed by the reflector in desired directions, which enhances the degree of freedom in design.

In a case where the head-up display device includes the reflector, the reflector may include a first reflector and a second reflector, and the first light and the second light may be reflected from the first reflector and the second reflector in order.

In this manner, reflecting light twice by the reflector facilitates the adjustment of an optical path in a desired direction.

In a case where the reflector includes the first reflector and the second reflector, an optical path of the first light from the picture generation unit to the first reflector and an optical path of the second light from the picture generation unit to the first reflector do not necessarily intersect.

In a case where the optical path of the first light from the picture generation unit to the first reflector and the optical path of the second light from the picture generation unit to the first reflector do not intersect, this head-up display device may include an intersection where the optical path of the first light from the picture generation unit to the first reflector and an optical path of the second light from the first reflector to the second reflector intersect.

In a case where the head-up display device includes the intersection, the optical path adjuster is preferably disposed on the optical path of the second light from the picture generation unit to the first reflector.

As described above, the intersection is not located on the optical path of the second light from the picture generation unit to the first reflector. For this reason, disposing the optical path adjuster on the optical path of the second light from the picture generation unit to the first reflector makes it possible to place the optical path adjuster not to overlap the intersection even when the picture generation unit is not separated from the first reflector. This makes it possible to prevent an increase in size of the device.

In a case where the reflector includes the first reflector and the second reflector, the first reflector preferably includes a first convex mirror configured to reflect the first light and a second convex mirror configured to reflect the second light, and the second reflector preferably includes one concave mirror configured to reflect both the first light and the second light.

Herein, "one concave mirror" refers to a concave mirror with the side close to the first reflector having one focal point. Therefore, for example, a reflecting member having two recesses coupled to form an apparently single member is not defined as one concave mirror.

Such a configuration enables the reflection of the first light and the second light in desired directions without increasing the curvature of the concave mirror. Accordingly, it is possible to prevent the occurrence of aberrations attributed to an increase in curvature of the concave mirror.

In addition, the optical path adjuster preferably reduces an amount of infrared light emitted from the optical path adjuster to less than an amount of the infrared light before the infrared light enters the optical path adjuster.

With this configuration, even when infrared light enters the head-up display device, an amount of the infrared light is reduced by the optical path adjuster. Accordingly, it is possible to prevent a rise in temperature of the picture generation unit which is attributed to infrared light.

To achieve the object, the head-up display device according to the invention is configured to display a first virtual image in front of an operator's point of view and a second virtual image in a position farther than the first virtual image, and the head-up display device includes one picture generation unit configured to emit first light which creates the first virtual image and second light which creates the second virtual image, a prism disposed on an optical path of the second light, a first convex mirror configured to reflect the first light, a second convex mirror configured to reflect the second light, and one concave mirror configured to reflect the first light reflected from the first convex mirror and the second light reflected from the second convex mirror toward a windshield.

Such a configuration enables the generation of the first virtual image and the second virtual image by one picture generation unit. Accordingly, the number of picture generation units is reduced and the device is prevented from increasing in size.

As described above, according to the invention, there is provided a head-up display device capable of displaying a short-distance virtual image and a long-distance virtual image without increasing the size of the device.

DESCRIPTION OF EMBODIMENTS

Hereinafter, an embodiment of a head-up display device according to the invention will be described with reference to the accompanying drawings. The following embodiment is described for purposes of illustration and not limitation. The embodiment of the invention may be modified and improved without departing from the gist of the invention. Furthermore, dimensions of each member herein may be exaggerated to facilitate understanding.

Figure 1:
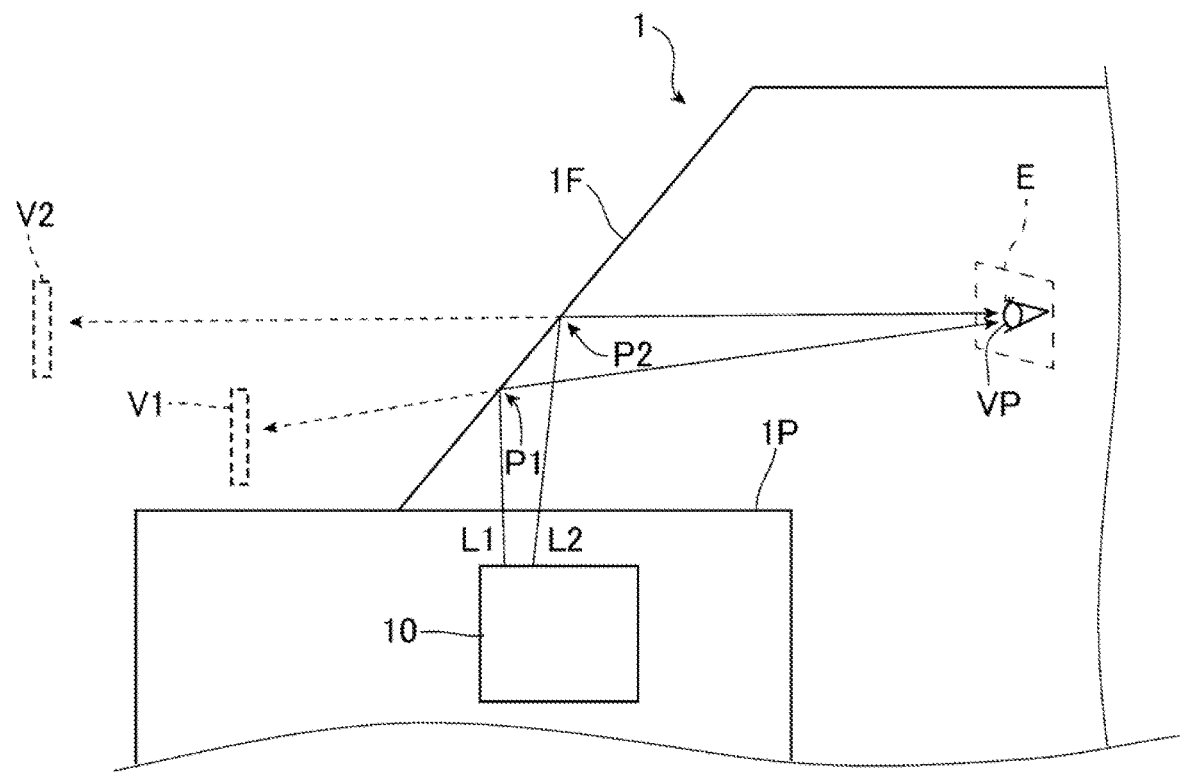
FIG. 1 is a schematic view of a head-up display device according to an embodiment of the invention shown together with a part of a vehicle on which the head-up display device is mounted.

FIG. 1 is a schematic view of a head-up display device 10 according to this embodiment shown together with a part of a vehicle 1 on which the head-up display device 10 is mounted. The vehicle 1 in the drawing is seen from the right-left direction. Note that the traveling direction of the vehicle 1 is referred to as the front, the left hand of the traveling direction is referred to as the left side, and the right hand of the traveling direction is referred to as the right side.

As illustrated in FIG. 1, the head-up display device 10 is installed, for example, in an instrument panel 1P of the vehicle 1. This head-up display device 10 is configured to emit first light L1 for creating a first virtual image V1 and second light L2 for creating a second virtual image V2. As described later, the first virtual image V1 appears in front of an operator's point of view VP through a windshield 1F and the second virtual image V2 appears in a position farther than the first virtual image V1 through the windshield 1F.

Figure 2:
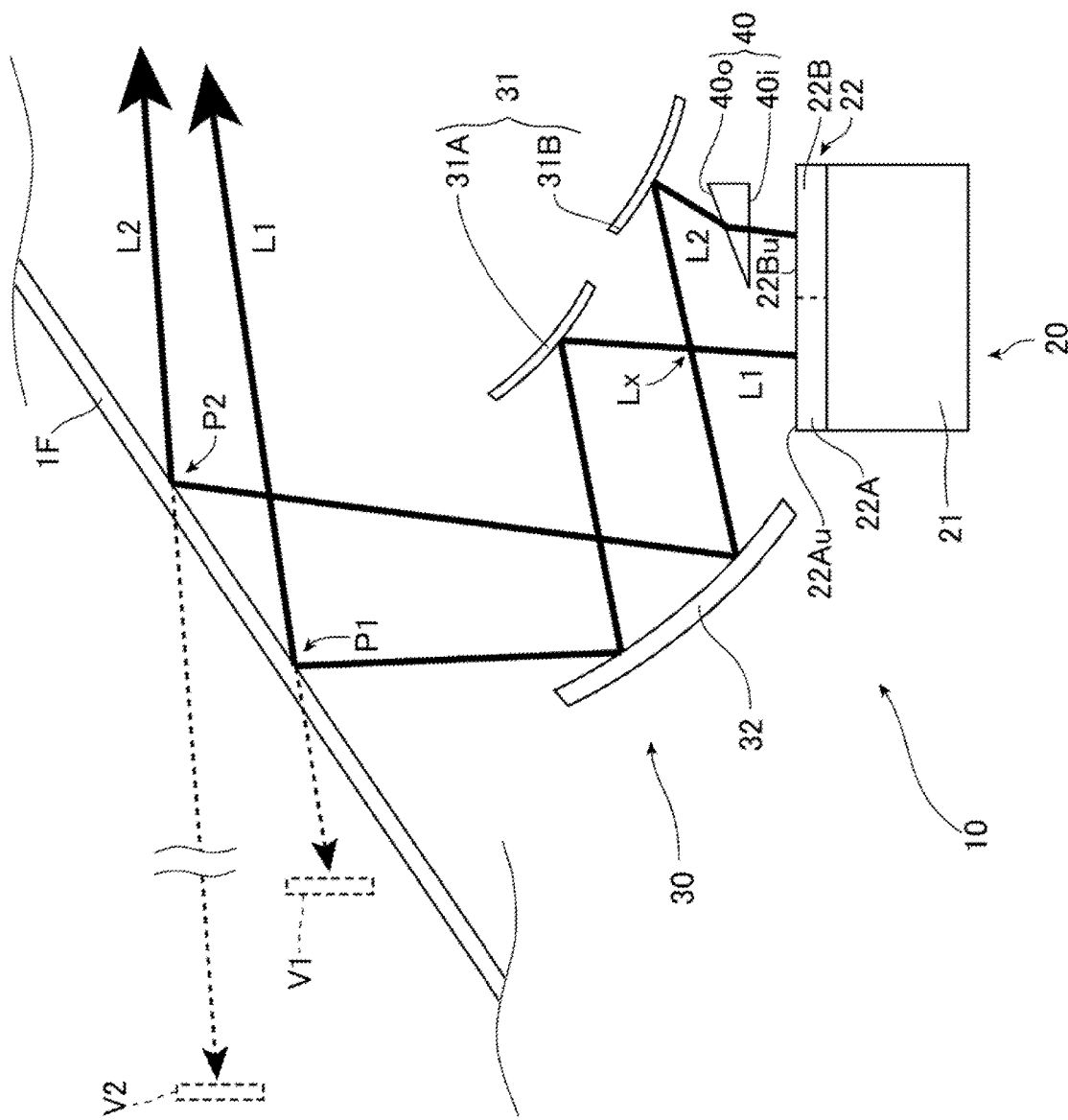
FIG. 2 is a schematic view of the head-up display device shown in FIG. 1 seen from the right-left direction.

FIG. 2 schematically illustrates a configuration of the head-up display device 10 seen from the right-left direction. As illustrated in FIG. 2, the head-up display device 10 includes one picture generation unit 20, a reflector 30, and an optical path adjuster 40 as main components.

The picture generation unit 20 includes a light source 21 and a single display 22.

The display 22 is disposed on an optical path of light emitted from the light source 21, and in this embodiment, the display 22 is a single plate liquid crystal display (LCD). The display 22 includes a first area 22A and a second area 22B adjacent to each other in the front-back direction. The first area 22A is located in front of the second area 22B. In the display 22 of this embodiment, voltages are applied to the first area 22A and the second area 22B independently, and liquid crystal molecules in the first area 22A and liquid crystal molecules in the second area 22B independently change their orientation patterns. Note that the display 22 is not limited to this configuration.

Light emitted from the light source 21 and incident on the first area 22A passes through the first area 22A and turns to the first light L1 having a distribution pattern according to the orientation pattern of the liquid crystal molecules in the first area 22A. In this embodiment, for example, this first light L1 is substantially collimated light having a width detectable by a human eye. In this embodiment, the first light L1 is emitted upward toward the reflector 30 while being inclined slightly backward from an output surface 22Au of the first area 22A. When this first light L1 is emitted to a predetermined projection plane, the first light L1 creates an image showing, for example, meter data such as the speed and rotation frequency of the vehicle 1 or signs on the road along which the vehicle 1 is running. Note that the image created by the first light L1 may be information other than meter data and traffic signs.

Light emitted from the light source 21 and incident on the second area 22B passes through the second area 22B and turns to the second light L2 having a distribution pattern according to the orientation pattern of the liquid crystal molecules in the second area 22B. In this embodiment, for example, this second light L2 is substantially collimated light having a width detectable by a human eye. In this embodiment, the second light L2 is emitted upward toward the reflector 30 from an output surface 22Bu of the second area 22B in a direction substantially parallel to the first light L1. The output surface 22Bu is a horizontal plane substantially coplanar with the output surface 22Au. When the second light L2 is emitted to a predetermined projection plane, the second light L2 creates an image in a position farther than the image created by the first light L1. In this embodiment, the image created by the second light L2 is larger in the eyes of an operator than the image created by the first light L1. The image created by the second light L2 is, for example, superimposed on a real scene and perceived by an operator of the vehicle 1 as augmented reality when the operator sees the image through the windshield 1F. Note that the image created by the second light L2 may be smaller in the eyes of an operator than the first light L1 and is not necessarily an image perceived as augmented reality.

The optical path adjuster 40 is disposed on an optical path of the second light L2 from the picture generation unit 20 to the reflector 30. This optical path adjuster 40 includes an optical element having light transmission properties and substantially zero optical power. In this embodiment, the optical path adjuster 40 is what is called a prism. Note that collimated light incident on an optical element having substantially zero optical power is emitted from the optical element while being prevented from converging and diverging. The optical path adjuster 40 includes an input surface 40i which the second light L2 enters and an output surface 40o from which the second light L2 is emitted. The input surface 40i and the output surface 40o are both flat and are not parallel to each other. The input surface 40i is substantially parallel to the output surface 22Bu of the display 22. The output surface 40o is an inclined surface that gradually rises from front to back. Note that the prism serving as the optical path adjuster 40 is not limited in shape.

The optical path adjuster 40 of this embodiment is also configured to reduce an amount of infrared light emitted from the optical path adjuster 40 to less than an amount of the infrared light before the infrared light enters the optical path adjuster 40. This optical path adjuster 40 is formed, for example, from predetermined resin mixed with an infrared light absorbing material such as a tungsten oxide material and a phthalocyanine material or formed by depositing an infrared light absorbing material on the input surface 40i or the output surface 40o of the optical path adjuster 40. Examples of the predetermined resin include acrylic resin, polycarbonate (PC) resin, cycloolefin polymer (COP) resin, cycloolefin copolymer (COC) resin, and silicone. Alternatively, the optical path adjuster 40 configured to reduce an amount of infrared light emitted from the optical path adjuster 40 to less than an amount of the infrared light before the infrared light enters the optical path adjuster 40 may be formed of glass.

The second light L2 emitted from the picture generation unit 20 in a direction substantially parallel to the first light L1 passes through the optical path adjuster 40 and is emitted from the output surface 40o in such a manner that the second light L2 gradually separates from the first light L1 as compared with a state before the second light L2 enters the optical path adjuster 40. For this reason, the second light L2 emitted from the output surface 40o to the reflector 30 is inclined backward compared with the first light L1 emitted from the picture generation unit 20 to the reflector 30. In this manner, a range of the second light L2 from the output surface 40o to the reflector 30 gradually separates from the first light L1 as the second light L2 travels upward. Furthermore, since the optical path adjuster 40 has substantially zero optical power, the second light L2 incident on the optical path adjuster 40 is emitted from the optical path adjuster 40 while being prevented from converging and diverging. In addition, even when the second light L2 slightly diverges or converges before and after passing through the optical path adjuster 40, the convergence and divergence are hardly perceived by human vision. In this manner, the second light L2 is emitted from the output surface 40o as substantially collimated light.

The reflector 30 is disposed on both an optical path of the first light L1 emitted from the picture generation unit 20 and an optical path of the second light L2 emitted from the optical path adjuster 40, being configured to reflect both the first light L1 and the second light L2 and allow each light to reach an operator's point of view VP. In this embodiment, the reflector 30 includes a first reflector 31 including a convex mirror and a second reflector 32 including one concave mirror.

The first reflector 31 is disposed on the optical path of the first light L1 emitted from the picture generation unit 20 and the optical path of the second light L2 emitted from the optical path adjuster 40, being configured to reflect both the first light L1 and the second light L2 toward the second reflector 32. In this embodiment, the first reflector 31 includes a first convex mirror 31A and a second convex mirror 31B disposed separately from each other. The first convex mirror 31A is disposed in a position before and above the second convex mirror 31B. Note that the first convex mirror 31A and the second convex mirror 31B may be connected. The first convex mirror 31A is disposed substantially right above the first area 22A and reflects the first light L1 forward and downward. The first light L1 reflected from the first convex mirror 31A enters an upper area of the second reflector 32 relative to the center in the perpendicular direction. In addition, the second convex mirror 31B substantially opposes the output surface 40o of the optical path adjuster 40 and reflects the second light L2 forward and downward. The second light L2 reflected from the second convex mirror 31B enters a lower area of the second reflector 32 relative to the center in the perpendicular direction.

In this embodiment, the optical path of the first light L1 from the picture generation unit 20 to the first reflector 31 and the optical path of the second light L2 from the picture generation unit 20 to the first reflector 31 do not intersect. In this embodiment, the optical path of the first light L1 from the picture generation unit 20 to the first reflector 31 and an optical path of the second light L2 from the first reflector 31 to the second reflector 32 intersect to form an intersection Lx.

The second reflector 32 is disposed on the optical paths of the first light L1 and the second light L2 reflected from the first reflector 31. The second reflector 32 reflects the first light L1 substantially right above and reflects the second light L2 backward and upward.

In this manner, in the reflector 30, the first light L1 and the second light L2 are reflected from the first reflector 31 and the second reflector 32 in order.

As illustrated in FIG. 1, the first light L1 reflected from the second reflector 32 is emitted to a predetermined area P1 of the windshield 1F. In addition, the second light L2 reflected from the second reflector 32 is emitted to an area P2 above the predetermined area P1 of the windshield 1F. The first light L1 and the second light L2 conducted to the windshield 1F are reflected from the areas P1 and P2 toward an eye box E on the operator's side and propagated to the eye box E. When the operator's point of view VP is put within the eye box E, the operator of the vehicle 1 visually perceives the first virtual image V1 created by the first light L1 and reflected from the area P1 in front of the point of view VP through the windshield 1F. Furthermore, when the operator's point of view VP is put within the eye box E, the operator of the vehicle 1 visually perceives the second virtual image V2 created by the second light L2 and reflected from the area P2 in a position farther than the first virtual image V1 through the windshield 1F. Since the second light L2 is emitted to the area P2 located above the area P1 irradiated with the first light L1, the second virtual image V2 appears above the first virtual image V1. In this embodiment, the windshield 1F is considered as a projection plane for displaying the first virtual image V1 and the second virtual image V2. As long as the first virtual image V1 and the second virtual image V2 are visually perceived, the projection plane is not limited to the windshield 1F and may be, for example, a combiner disposed in the vehicle 1.

As described above, the head-up display device 10 of this embodiment includes one picture generation unit 20 that emits both the first light L1 and the second light L2 and includes the optical path adjuster 40 disposed on the optical path of the second light L2 and having light transmission properties and substantially zero optical power. This optical path adjuster 40 gradually separates the first light L1 and the second light L2 as compared with a state before the second light L2 enters the optical path adjuster 40 in such a manner that the first light L1 creates the first virtual image V1 in a position closer to an operator and the second light L2 creates the second virtual image V2 in a position farther from the operator than the first virtual image V1.

Furthermore, the head-up display device 10 of this embodiment includes one picture generation unit 20 configured to emit the first light L1 that creates the first virtual image V1 and the second light L2 that creates the second virtual image V2 in a position farther than the first virtual image V1, the prism as the optical path adjuster 40 disposed on the optical path of the second light L2, the first convex mirror 31A that reflects the first light L1, the second convex mirror 31B that reflects the second light L2, and the second reflector 32 including one concave mirror that reflects the first light L1 reflected from the first convex mirror 31A and the second light L2 reflected from the second convex mirror 31B toward the windshield 1F.

In order to allow sufficient space between two virtual images to offer a sense of perspective to an operator, light for creating a long-distance virtual image and light for creating a short-distance virtual image are typically required to be emitted from a picture generation unit while not being close to each other. However, a plurality of light rays emitted from one picture generation unit typically tends to be emitted in almost parallel to each other, and it is difficult to generate virtual images at long and short distances distinguishable for an operator by one picture generation unit. In this head-up display device, contrarily, the first light L1 and the second light L2 gradually separate from each other through the optical path adjuster 40 as compared with a state before the second light L2 enters the optical path adjuster 40 in such a manner that the first light L1 creates the first virtual image V1 and the second light L2 creates the second virtual image V2. Therefore, it is possible to generate two virtual images that offer a sense of perspective to an operator by one picture generation unit.

Unlike a case, for example, where a long-distance virtual image and a short-distance virtual image are generated by two picture generation units, this head-up display device 10 enables the generation of a long-distance virtual image and a short-distance virtual image by one picture generation unit. Accordingly, the number of picture generation units is reduced and the device is prevented from increasing in size.

As described above, the head-up display device 10 of this embodiment also includes the reflector 30 configured to reflect both the first light L1 and the second light L2 and allow each light to reach the point of view VP. Accordingly, optical paths of the first light L1 and the second light L2 are changed by the reflector 30 in desired directions, which enhances the degree of freedom in design. In addition, this reflector 30 includes the first reflector 31 and the second reflector 32 that reflect the first light L1 and the second light L2 in order. In this manner, reflecting light twice by the reflector 30 facilitates the adjustment of an optical path in a desired direction.

Furthermore, in the head-up display device 10 of this embodiment, as described above, the optical path of the first light L1 from the picture generation unit 20 to the first reflector 31 and the optical path of the second light L2 from the picture generation unit 20 to the first reflector 31 do not intersect, and this head-up display device 10 includes the intersection Lx where the optical path of the first light L1 from the picture generation unit 20 to the first reflector 31 and the optical path of the second light L2 from the first reflector 31 to the second reflector 32 intersect. With this configuration, in this embodiment, the intersection Lx is not disposed on the optical path of the second light L2 from the picture generation unit 20 to the first reflector 31. As in this embodiment, disposing the optical path adjuster 40 on the optical path of the second light L2 from the picture generation unit 20 to the first reflector 31 makes it possible to place the optical path adjuster 40 not to overlap the intersection Lx even when the picture generation unit 20 is not separated from the first reflector 31. Such a configuration effectively prevents the device from increasing in size.

Still further, in the head-up display device 10 of this embodiment, the first reflector 31 includes the first convex mirror 31A that reflects the first light L1 and the second convex mirror 31B that reflects second light L2, and the second reflector 32 includes one concave mirror that reflects both the first light L1 and the second light L2. Such a configuration enables the reflection of the first light L1 and the second light L2 in desired directions without increasing the curvature of the concave mirror. Accordingly, it is possible to prevent the occurrence of aberrations attributed to an increase in curvature of the concave mirror.

Still further, in the head-up display device 10 of this embodiment, the optical path adjuster 40 is configured to reduce an amount of infrared light emitted from the optical path adjuster 40 to less than an amount of the infrared light before the infrared light enters the optical path adjuster 40. With this configuration, even when infrared light enters the head-up display device, an amount of the infrared light is reduced by the optical path adjuster. Accordingly, it is possible to prevent a rise in temperature of the picture generation unit which is attributed to infrared light.

In order to display an image by the head-up display device 10 at a longer distance, the reflector 30 may include a mirror having large curvature. However, sunlight may enter the head-up display device 10, and when the sunlight is reflected from the mirror with large curvature, the sunlight may be condensed in a narrow range of the display 22 of the picture generation unit 20. In this case, a part of the display 22 irradiated with the sunlight may be heated up by infrared light. However, as described above, the optical path adjuster 40 of this embodiment is configured to reduce an amount of infrared light and is disposed on the optical path of the second light L2 that creates a long-distance image. Therefore, even in a case where the curvature of the first reflector 31 and that of the second reflector 32 in the reflector 30 are increased to display a long-distance image by the second light L2, an amount of infrared light with which the display 22 is irradiated is reduced through the optical path adjuster 40, and the display 22 is prevented from being heated up.

Furthermore, in order to display a larger image by the head-up display device 10, the reflector 30 may include a mirror having a large reflecting plane. However, a large reflecting plane increases an amount of sunlight reflected from the reflecting plane and emitted to the display 22, and a large amount of infrared light may heat up the display 22. However, as described above, the optical path adjuster 40 of this embodiment is configured to reduce an amount of infrared light and is disposed on the optical path of the second light L2 that creates a large image. Accordingly, even when a reflecting plane of the first reflector 31 and that of the second reflector 32 in the reflector 30 are made large to enlarge an image of the second light L2, through the optical path adjuster 40, it is possible to reduce an amount of infrared light to be emitted to the display 22, and the display 22 is prevented from being heated up.

The embodiment of the invention has been illustrated, but the invention is not limited thereto.

For example, in the embodiment, described is an example in which the optical path of the first light L1 from the picture generation unit 20 to the first reflector 31 and the optical path of the second light L2 from the picture generation unit 20 to the first reflector 31 do not intersect and the optical path of the first light L1 from the picture generation unit 20 to the first reflector 31 and the optical path of the second light L2 from the first reflector 31 to the second reflector 32 intersect. However, for example, the optical path of the first light L1 from the picture generation unit 20 to the first reflector 31 and the optical path of the second light L2 from the picture generation unit 20 to the first reflector 31 may intersect, and the optical path of the first light L1 from the picture generation unit 20 to the first reflector 31 and the optical path of the second light L2 from the first reflector 31 to the second reflector 32 do not necessarily intersect.

Furthermore, in the embodiment, the reflector 30 has been illustrated as a member including the first reflector 31 including a convex mirror and the second reflector 32 including a concave mirror. However, the reflector 30 is not limited to this configuration. For example, the first reflector 31 and the second reflector 32 both may be convex mirrors or concave mirrors. Alternatively, the first reflector 31 may be a concave mirror and the second reflector 32 may be a convex mirror or at least one of the first reflector 31 and the second reflector 32 may be a flat mirror. In the embodiment, the first reflector 31 has been illustrated as a member including the first convex mirror 31A and the second convex mirror 31B, but the first reflector 31 may include one mirror. In addition, in the embodiment, the second reflector 32 has been illustrated as a member including one concave mirror, but the second reflector 32 may include two separate mirrors corresponding to the first light L1 and the second light L2.

Furthermore, the reflector 30 may include one reflector or may include three or more reflectors that continuously reflect the first light L1 and the second light L2 in order. Note that increasing the number of reflections by reflectors in order makes it possible to change optical paths of the first light L1 and the second light L2 finely, which enhances the degree of freedom in design.

Still further, in the embodiment, the optical path adjuster 40 has been illustrated as a member disposed on the optical path of the second light L2 from the picture generation unit 20 to the reflector 30 but the position of the optical path adjuster 40 is not limited thereto. For example, instead of the optical path of the second light L2 from the picture generation unit 20 to the reflector 30, an optical path adjuster may be disposed on an optical path of the first light L1 from the picture generation unit 20 to the reflector 30. In this case, this optical path adjuster gradually separates the first light L1 and the second light L2 as compared with a state before the first light L1 enters the optical path adjuster in such a manner that the first light L1 creates the first virtual image V1 in a position closer to an operator and the second light L2 creates the second virtual image V2 in a position farther from the operator than the first virtual image V1. Alternatively, not only the optical path of the second light L2 from the picture generation unit 20 to the reflector 30, an optical path adjuster may also be disposed on the optical path of the first light L1 from the picture generation unit 20 to the reflector 30. In this case, this optical path adjuster gradually separates the first light L1 and the second light L2 as compared with a state before the first light L1 and the second light L2 enters the optical path adjuster in such a manner that the first light L1 creates the first virtual image V1 in a position closer to an operator and the second light L2 creates the second virtual image V2 in a position farther from the operator than the first virtual image V1. As described above, with the intersection Lx where the optical path of the first light L1 from the picture generation unit 20 to the first reflector 31 and the optical path of the second light L2 from the first reflector 31 to the second reflector 32 intersect, it is preferable that the optical path adjuster 40 should not be disposed on the optical path of the first light L1 from the picture generation unit 20 to the reflector 30 but on the optical path of the second light L2 from the picture generation unit 20 to the reflector 30. This makes it easy to place the optical path adjuster 40 not to overlap the intersection Lx.

In a case where an optical path adjuster is disposed on the optical path of the first light L1, this optical path adjuster is preferably configured to reduce an amount of infrared light emitted from the optical path adjuster to less than an amount of the infrared light before the infrared light enters the optical path adjuster.

Still further, in the embodiment, the head-up display device 10 has been illustrated as a member including the reflector 30. However, the reflector 30 is not necessarily essential as long as the optical path adjuster 40 is disposed on an optical path of at least one of the first light L1 and the second light L2 and gradually separates the first light L1 and the second light L2 as compared with a state before at least one of the first light L1 and the second light L2 enters the optical path adjuster 40 in such a manner that the first light L1 creates the first virtual image V1 in a position closer to an operator and the second light L2 creates the second virtual image V2 in a position farther from the operator than the first virtual image V1.

Still further, in the embodiment, the optical path adjuster 40 has been described as a prism, but the optical path adjuster 40 may be an optical element having substantially zero optical power other than a prism as long as the optical path adjuster 40 is disposed on an optical path of at least one of the first light L1 and the second light L2 and gradually separates the first light L1 and the second light L2 as compared with a state before the first light L1 and the second light L2 enters the optical path adjuster 40 in such a manner that the first light L1 creates the first virtual image V1 in a position closer to an operator and the second light L2 creates the second virtual image V2 in a position farther from the operator than the first virtual image V1.

Still further, in the embodiment, the output surface 22Au and the output surface 22Bu of the picture generation unit 20 are illustrated as horizontal planes, and the first light L1 and the second light L2 are illustrated as being emitted substantially upward from the output surface 22Au and the output surface 22Bu. However, the invention is not limited to this embodiment. For example, the picture generation unit 20 may have a perpendicular output surface, and the head-up display device may be configured to emit the first light L1 and the second light L2 from this output surface substantially forward or backward.

According to the invention, there is provided a head-up display device capable of displaying a short-distance virtual image and a long-distance virtual image without increasing the size of the device. The head-up display device is employable in, for example, the field of vehicles.

The invention claimed is:

1. A head-up display device configured to display a first virtual image in front of an operator's point of view and a second virtual image in a position farther than the first virtual image,
the head-up display device comprising:
one picture generation unit configured to emit first light which creates the first virtual image and second light which creates the second virtual image;
a prism disposed on an optical path of the second light;
a first convex mirror configured to reflect the first light;
a second convex mirror configured to reflect the second light; and
one concave mirror configured to reflect the first light reflected from the first convex mirror and the second light reflected from the second convex mirror toward a windshield.

2. A head-up display device comprising:
one picture generation unit configured to emit both first light and second light;
an optical path adjuster disposed on an optical path of at least one of the first light and the second light and having a light transmission property and substantially zero optical power;
the optical path adjuster being configured to gradually separate the first light and the second light as compared with a state before at least one of the first light and the second light enters the optical path adjuster in such a manner that the first light creates a first virtual image in a position closer to an operator and the second light creates a second virtual image in a position farther from the operator than the first virtual image.

3. The head-up display device according to claim 2 comprising a reflector configured to reflect both the first light and the second light and allow each light to reach a point of view of the operator.

4. The head-up display device according to claim 3,
wherein the reflector includes a first reflector and a second reflector, and
the first light and the second light are reflected from the first reflector and the second reflector in order.

5. The head-up display device according to claim 4,
wherein the first light travels through an optical path from the picture generation unit to the first reflector not intersecting an optical path of the second light from the picture generation unit to the first reflector.

6. The head-up display device according to claim 5 comprising an intersection in which the optical path of the first light from the picture generation unit to the first reflector and an optical path of the second light from the first reflector to the second reflector intersect.

7. The head-up display device according to claim 6,
wherein the optical path adjuster is disposed on the optical path of the second light from the picture generation unit to the first reflector.

8. The head-up display device according to claim 4,
wherein the first reflector includes a first convex mirror configured to reflect the first light and a second convex mirror configured to reflect the second light, and
the second reflector includes one concave mirror configured to reflect both the first light and the second light.

9. The head-up display device according to claim 2,
wherein the optical path adjuster reduces an amount of infrared light emitted from the optical path adjuster to less than an amount of the infrared light before the infrared light enters the optical path adjuster.

* * * * *